(12) United States Patent
Ranjbar et al.

(10) Patent No.: US 11,533,076 B1
(45) Date of Patent: Dec. 20, 2022

(54) PHASE BASED DISTANCE ESTIMATION WITH NON-ZERO INTERMEDIATE FREQUENCY

(71) Applicant: Shenzhen Goodix Technology Co., Ltd., Shenzhen (CN)

(72) Inventors: Mohammad Ranjbar, San Diego, CA (US); Amir Dezfooliyan, San Diego, CA (US); Waleed Younis, San Diego, CA (US)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/491,490

(22) Filed: Sep. 30, 2021

(51) Int. Cl.
*H04B 1/38* (2015.01)
*H04B 1/403* (2015.01)
*H04B 1/48* (2006.01)

(52) U.S. Cl.
CPC .............. *H04B 1/403* (2013.01); *H04B 1/48* (2013.01)

(58) Field of Classification Search
CPC ... H04B 1/02; H04B 1/06; H04B 1/38; H04B 1/40; H04B 1/403; H04B 1/525; H04B 1/405; H04B 1/408
See application file for complete search history.

(56) References Cited

U.S. PATENT DOCUMENTS

2006/0154611 A1* 7/2006 Newton .................. G01S 11/02
455/67.16
2019/0187262 A1* 6/2019 Moe ........................ G01S 13/38

* cited by examiner

*Primary Examiner* — Tuan Pham
(74) *Attorney, Agent, or Firm* — Kilpatrick Townsend & Stockton LLP

(57) ABSTRACT

A transceiver circuit is disclosed. The transceiver circuit includes an antenna, a receiver RF chain configured to receive a receiver RF signal from the antenna, a transmitter RF chain configured to transmit a transmitter RF signal to the antenna, a frequency synthesizer configured to generate an oscillator signal, and a controller configured to cause the receiver RF chain to receive a first reflection signal from the antenna, down convert the first reflection signal to a non-zero intermediate frequency, and determine a range estimate to another transceiver circuit based on a phase of the first reflection signal.

19 Claims, 8 Drawing Sheets

US 11,533,076 B1

PHASE BASED DISTANCE ESTIMATION WITH NON-ZERO INTERMEDIATE FREQUENCY

TECHNICAL FIELD

The subject matter described herein relates to determining a distance (ranging) between two transceivers, and more particularly to determining the distance with non-zero intermediate frequency receivers.

BACKGROUND

Distances between two communicating transceivers are increasingly used for various applications. For example, various Bluetooth Low Energy (BLE) and internet of things (IOT) applications require accurate distance measurements. Various distance measurement or ranging techniques are used to determine the distances between transceivers. Of these, phase-based ranging techniques are of increasing interest. Techniques for accurately calculating distances between transceivers with non-zero intermediate frequency receivers are needed in the art.

SUMMARY

One inventive aspect is a transceiver circuit, including an antenna, a receiver RF chain configured to receive a receiver RF signal from the antenna, a transmitter RF chain configured to transmit a transmitter RF signal to the antenna, a frequency synthesizer configured to generate an oscillator signal, and a controller configured to cause the receiver RF chain to receive a first reflection signal from the antenna, down convert the first reflection signal to a non-zero intermediate frequency, and determine a range estimate to another transceiver circuit based on a phase of the first reflection signal.

In some embodiments, the controller is further configured to: before causing the transmitter RF chain to transmit a first initiation signal, and, before causing the receiver RF chain to receive the first reflection signal, cause the frequency synthesizer to generate the oscillator signal at a first working frequency; cause the transmitter RF chain to transmit, at the first working frequency, the first initiation signal to the antenna, where the first initiation signal is part of a first signal exchange; cause the receiver RF chain to receive the first reflection signal from the antenna at the first working frequency, where the first reflection signal is part of the first signal exchange; after causing the transmitter RF chain to transmit the first initiation signal, and, after causing the receiver RF chain to receive the first reflection signal, cause the frequency synthesizer to generate the oscillator signal at a second working frequency, where the second working frequency is not equal to the first working frequency; and causing the frequency synthesizer to continuously generate the oscillator signal at the first working frequency until the causing of the frequency synthesizer to generate the oscillator signal at the second working frequency.

In some embodiments, one of: the transmitter RF chain transmits the first initiation signal operating in a zero-IF mode, and the receiver RF chain receives the first reflection signal operating in a high-side injection mode; and the transmitter RF chain transmits the first initiation signal operating in the zero-IF mode, and the receiver RF chain receives the first reflection signal operating in a low-side injection mode.

In some embodiments, one of: the transmitter RF chain transmits the first initiation signal operating in a transmitter high-side injection mode, and the receiver RF chain receives the first reflection signal operating in a receiver high-side injection mode; and the transmitter RF chain transmits the first initiation signal operating in a transmitter low-side injection mode, and the receiver RF chain receives the first reflection signal operating in a receiver low-side injection mode.

In some embodiments, the controller is further configured to, after causing the frequency synthesizer to generate the oscillator signal at the second working frequency: cause the transmitter RF chain to transmit, at the second working frequency, a second initiation signal to the antenna, where the second initiation signal is part of a second signal exchange; cause the receiver RF chain to receive, at the second working frequency, a second reflection signal from the antenna, where the second reflection signal is part of the second signal exchange; cause the receiver RF chain to down convert the second reflection signal to a second intermediate frequency signal at the non-zero intermediate frequency; after causing the transmitter RF chain to transmit the second initiation signal, and, after causing the receiver RF chain to receive the second reflection signal, cause the frequency synthesizer to generate the oscillator signal at a third working frequency, where the third working frequency is not equal to the second working frequency; and cause the frequency synthesizer to continuously generate the oscillator signal at the second working frequency until the causing of the frequency synthesizer to generate the oscillator signal at the third working frequency.

In some embodiments, the controller is further configured to determine the range estimate based on a phase of the second reflection signal.

In some embodiments, the transmitter RF chain transmits the first initiation signal to the antenna operating with a DC intermediate frequency.

In some embodiments, the transmitter RF chain transmits the first initiation signal to the antenna operating with a non-zero intermediate frequency.

Another inventive aspect is a transceiver circuit, including an antenna, a receiver RF chain configured to receive a receiver RF signal from the antenna, a transmitter RF chain configured to transmit a transmitter RF signal to the antenna, a frequency synthesizer configured to generate an oscillator signal, and a controller configured to: before causing the receiver RF chain to receive a first initiation signal, and, before causing the transmitter RF chain to transmit a first reflection signal, causing the frequency synthesizer to generate the oscillator signal at a first working frequency; cause the receiver RF chain to receive, at the first working frequency, the first initiation signal from the antenna, where the first initiation signal is part of a first signal exchange, cause the receiver RF chain to down convert the first initiation signal to a first intermediate frequency signal at a non-zero intermediate frequency; cause the transmitter RF chain to transmit, at the first working frequency, the first reflection signal to the antenna, where the first reflection signal is part of the first signal exchange; after causing the transmitter RF chain to transmit the first reflection signal, and, after causing the receiver RF chain to receive the first initiation signal, cause the frequency synthesizer to generate the oscillator signal at a second working frequency, where the second working frequency is not equal to the first working frequency; and cause the frequency synthesizer to continuously generate the oscillator signal at the first working frequency until the causing of the frequency synthesizer to generate the oscillator signal at the second working frequency.

In some embodiments, one of the transmitter RF chain transmits the first reflection signal operating in a zero-IF mode, and the receiver RF chain receives the first initiation signal operating in a high-side injection mode, and the transmitter RF chain transmits the first reflection signal operating in the zero-IF mode, and the receiver RF chain receives the first initiation signal operating in a low-side injection mode.

In some embodiments, one of the transmitter RF chain transmits the first reflection signal operating in a transmitter high-side injection mode, and the receiver RF chain receives the first initiation signal operating in a receiver high-side injection mode, and the transmitter RF chain transmits the first initiation signal operating in a transmitter low-side injection mode, and the receiver RF chain receives the first reflection signal operating in a transmitter low-side injection mode.

In some embodiments, the controller is further configured to, after causing the frequency synthesizer to generate the oscillator signal at the second working frequency: cause the receiver RF chain to receive, at the second working frequency, a second initiation signal from the antenna, where the second initiation signal is part of a second signal exchange; cause the receiver RF chain to down convert the second initiation signal to a second intermediate frequency signal at the non-zero intermediate frequency; cause the transmitter RF chain to transmit, at the first working frequency, a second reflection signal to the antenna, where the second reflection signal is part of the second signal exchange; after causing the transmitter RF chain to transmit the second reflection signal, and, after causing the receiver RF chain to receive the second initiation signal, cause the frequency synthesizer to generate the oscillator signal at a third working frequency, where the third working frequency is not equal to the second working frequency; and cause the frequency synthesizer to continuously generate the oscillator signal at the second working frequency until the causing of the frequency synthesizer to generate the oscillator signal at the third working frequency.

In some embodiments, the first working frequency is specified by a communications standard.

In some embodiments, the first working frequency is offset by the non-zero intermediate frequency from a frequency specified by a communications standard.

In some embodiments, the transmitter RF chain transmits the first reflection signal to the antenna operating with a DC intermediate frequency.

In some embodiments, the transmitter RF chain transmits the first reflection signal to the antenna operating with a non-zero intermediate frequency.

Another inventive aspect is a system, including a first transceiver circuit, and a second transceiver circuit, where the first transceiver circuit is configured to before transmitting a first initiation signal, and, before receiving a first reflection signal, generate a first oscillator signal at a first working frequency; transmit, at the first working frequency, the first initiation signal to the first transceiver circuit, where the first initiation signal is part of a first signal exchange; receive, at the first working frequency, the first reflection signal from the second transceiver circuit, where the first reflection signal is part of the first signal exchange; down convert the first reflection signal to a first intermediate frequency signal at a first non-zero intermediate frequency; after transmitting the first initiation signal, and, after receiving the first reflection signal, generate the first oscillator signal at a second working frequency, where the second working frequency is not equal to the first working frequency; generate the first oscillator signal at the first working frequency until the generating of the first oscillator signal at the second working frequency; and determine a range estimate to the second transceiver circuit based on a phase of the first initiation signal and on a phase of the first reflection signal, where the second transceiver circuit is configured to: before receiving the first initiation signal, and, before transmitting the first reflection signal, generate a second oscillator signal at a third working frequency; receive, at the third working frequency, the first initiation signal, where the first initiation signal is part of the first signal exchange; down convert the first initiation signal to a second intermediate frequency signal at a second non-zero intermediate frequency; transmit, at the third working frequency, the first reflection signal to the first transceiver circuit, where the first reflection signal is part of the first signal exchange; after transmitting the first reflection signal, and, after receiving the first initiation signal, generate the second oscillator signal at a fourth working frequency, where the fourth working frequency is not equal to the third working frequency; and continuously generate the second oscillator signal at the third working frequency until the generating of the second oscillator signal at the fourth working frequency.

In some embodiments, the first transceiver circuit is further configured to determine a range estimate based on the first initiation signal and the first reflection signal.

In some embodiments, the first transceiver circuit is further configured to, after causing generating the first oscillator signal at the second working frequency: transmit, at the second working frequency, a second initiation signal to the second transceiver circuit, where the second initiation signal is part of a second signal exchange; receive, at the second working frequency, a second reflection signal from the second transceiver circuit, where the second reflection signal is part of the second signal exchange; down convert the second reflection signal to a third intermediate frequency signal at the first non-zero intermediate frequency; after transmitting the second initiation signal, and, after receiving the second reflection signal, generate the first oscillator signal at a fifth working frequency, where the fifth working frequency is not equal to the third working frequency; and continuously generate the first oscillator signal at the second working frequency until the generating of the first oscillator signal at the fifth working frequency, where the second transceiver circuit is further configured to, after generating the second oscillator signal at the second working frequency: transmit, at the fourth working frequency, the second initiation signal to the first transceiver circuit, where the second initiation signal is part of the second signal exchange; receive, at the fourth working frequency, the second reflection signal from the first transceiver circuit, where the second reflection signal is part of the second signal exchange; down convert the second reflection signal to a fourth intermediate frequency signal at the second non-zero intermediate frequency; after transmitting the second initiation signal, and, after receiving the second reflection signal, generate the second oscillator signal at a sixth working frequency, where the sixth working frequency is not equal to the third working frequency; and continuously generate the second oscillator signal at the third working frequency until the generating of the second oscillator signal at the sixth working frequency.

In some embodiments, the first transceiver circuit is configured to determine a range estimate based on the second initiation signal and the second reflection signal.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations.

When practical, similar reference numbers denote similar structures, features, or elements.

DETAILED DESCRIPTION

Particular embodiments of the invention are illustrated herein in conjunction with the drawings. Particular embodiments of the invention are illustrated herein in conjunction with the drawings.

Various details are set forth herein as they relate to certain embodiments. However, the invention can also be implemented in ways which are different from those described herein. Modifications can be made to the discussed embodiments by those skilled in the art without departing from the invention. Therefore, the invention is not limited to particular embodiments disclosed herein.

Figure 1A:
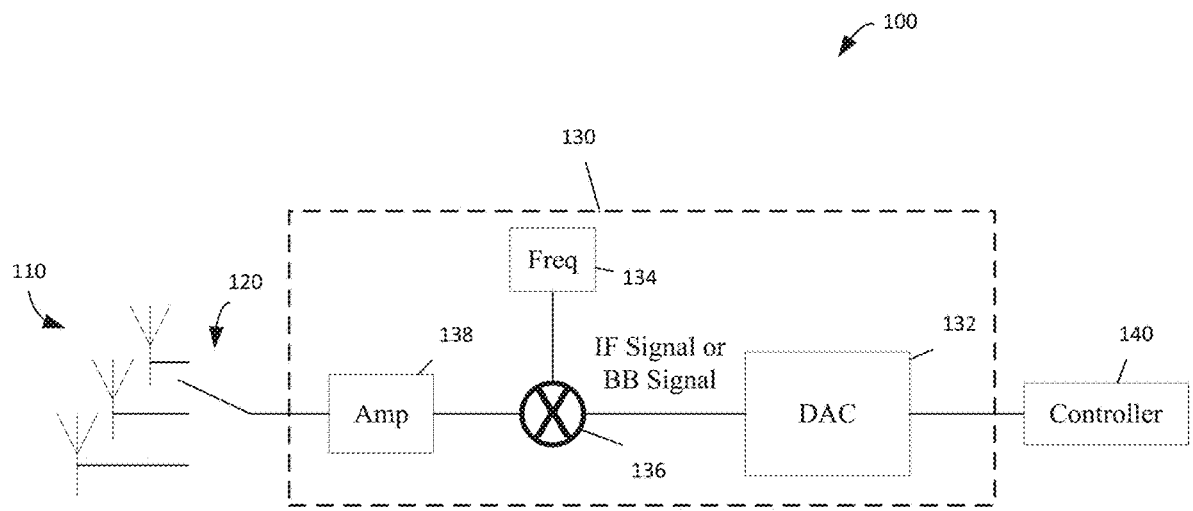
FIG. 1A is a schematic diagram of an embodiment of a transmitter circuit according to some embodiments.
Figure 1B:
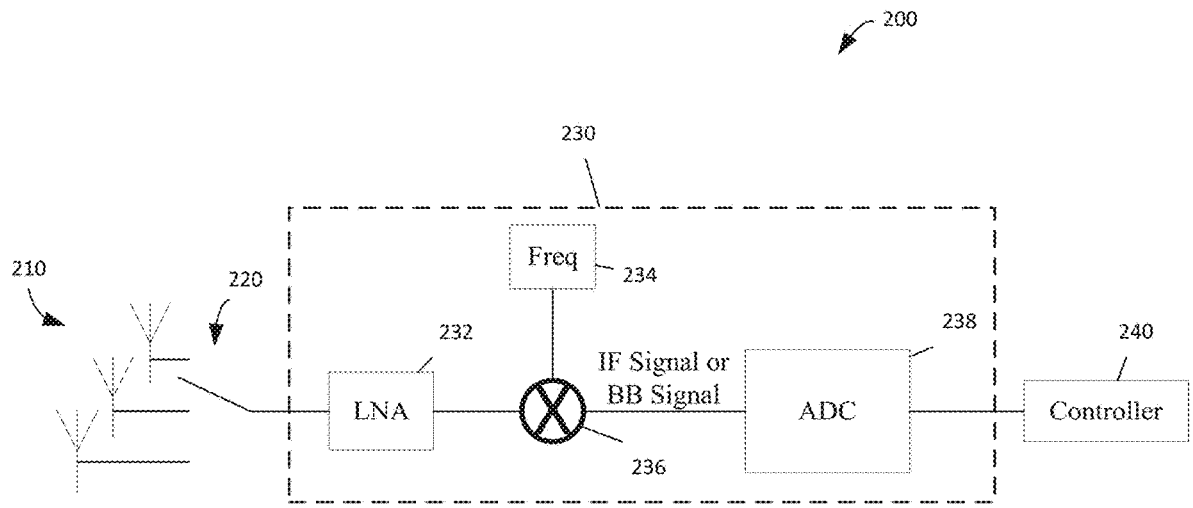
FIG. 1B is a schematic diagram of an embodiment of a receiver circuit according to some embodiments.
Figure 2:
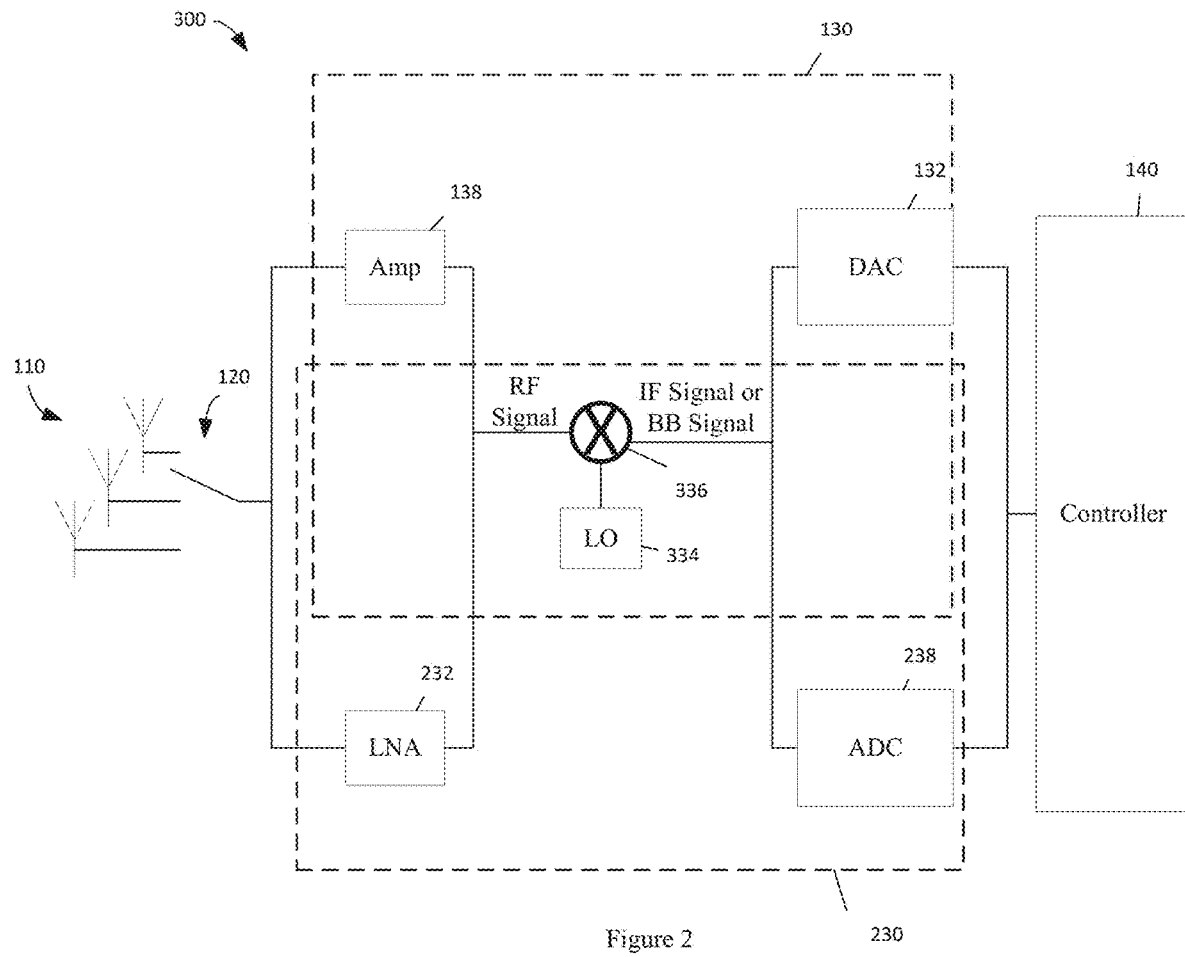
FIG. 2 is a schematic diagram of an embodiment of a transceiver circuit according to some embodiments.

Embodiments illustrate circuits and methods for determining a distance between first and second transceivers. The distances are determined using phased based methods with non-zero IF receivers. The distances may be calculated using techniques which maintain oscillator frequency throughout each of a number of signal exchanges. FIGS. 1A and 1B respectively illustrate schematic diagrams of a receiver circuit and a transmitter circuit. FIG. 2 is a schematic diagram of an embodiment of a transceiver circuit according to some embodiments. FIGS. 3-9 are schematic diagrams and flowchart diagrams illustrating methods of determining a distance between first and second transceivers according to some embodiments.

FIG. 1A is a schematic diagram of an embodiment of a transmitter circuit 100 according to an embodiment. Transmitter circuit 100 includes antenna or antenna array 110, switch 120, RF chain 130, and controller 140. Transmitter circuit 100 illustrates a particular example. Other embodiments of transmitter circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to RF chain 130, and switch 120 may be omitted. In embodiments where antenna or antenna array 110 includes multiple antennas, each antenna may be directly connected to a separate RF chain. Each of the RF chains may have the features of RF chain 130.

Antenna or antenna array 110 may be configured to transmit RF signals to a receiver circuit, such as receiver circuit 200 described below with reference to FIG. 1B. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140.

Controller 140 is configured to provide a baseband digital signal to RF chain 130, where the digital signal encodes the information signal to be transmitted by antenna or antenna array 110.

RF chain 130 includes digital to analog converter (DAC) 132, mixer 136, frequency synthesizer 134, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog intermediate or baseband frequency signal (IF signal or BB signal) representing the digital signal, using techniques known in the art. Various digital to analog converter, up-conversion, and baseband and/or IF signal processing structures known in the art may be used.

Mixer 136 receives the analog intermediate or baseband frequency signal output from the digital to analog converter 132 and an oscillator signal at the carrier frequency generated by frequency synthesizer 134. In response to the analog intermediate or baseband frequency signal and the oscillator signal, mixer 136 up converts the analog intermediate or baseband frequency signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal the high frequency signal is driven to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 1A, control signals from controller 140 may control certain variable functionality of switch 120, power amplifier 138, frequency synthesizer 134, mixer 136, and digital to analog converter 132, for example, as understood by those of skill in the art.

The control signals from controller 140 may, for example, control switch 120 to control which of multiple antennas RF chain 130 drives the high frequency signal with.

In embodiments having multiple antennas each connected to one of multiple RF chains, controller 140 may generate control signals for each of the RF chains.

FIG. 1B is a schematic diagram of an embodiment of a receiver circuit 200 according to an embodiment. Receiver circuit 200 includes antenna or antenna array 210, switch 220, RF chain 230, and controller 240. Receiver circuit 200 illustrates a particular example. Other embodiments of receiver circuits may be used.

Antenna or antenna array 210 may be any antenna or antenna array. For example, in some embodiments, antenna or antenna array 210 includes 1, 2, 3, 4, or more antennas. In some embodiments, antenna or antenna array 210 includes a linear antenna array. In some embodiments, antenna or antenna array 210 includes a two dimensional antenna array, for example, having multiple rows of linear antenna arrays.

In embodiments where antenna or antenna array 210 includes one antenna, the one antenna may be connected directly to RF chain 230, and switch 220 may be omitted. In embodiments where antenna or antenna array 210 includes multiple antennas, each antenna may be directly connected to a separate RF chain. Each of the RF chains may have the features of RF chain 230.

Antenna or antenna array 210 may be configured to receive RF signals generated by a transmitter, such as transmitter 100 described above with reference to FIG. 1A.

RF chain 230 includes low noise amplifier (LNA) 232, frequency synthesizer 234, mixer 236, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 210, for example, according to a programmable electrical connection formed by switch 220, as controlled by controller 240. The high frequency signal is amplified by low noise amplifier 232 to generate an amplified RF signal, using techniques known in the art. Various low noise amplifier structures known in the art may be used.

Mixer 236 receives the amplified RF signal output from the low noise amplifier 232 and an oscillator signal at or substantially at the carrier frequency generated by frequency synthesizer 234. In response to the amplified RF signal and the oscillator signal, mixer 236 down converts the amplified RF signal from the low noise amplifier 232 to an intermediate or baseband frequency signal, using techniques known in the art. Various mixer structures known in the art may be used. The resulting intermediate or baseband frequency signal includes information of the low frequency information signal.

The intermediate or baseband frequency signal is then processed by the analog-to-digital converter 238 to generate a digital signal representing the intermediate or baseband frequency signal, using techniques known in the art. Various baseband and/or IF signal processing, down-conversion, and analog-to-digital converter structures known in the art may be used.

Controller 240 receives the baseband digital representation of the intermediate or baseband frequency signal.

As understood by those of skill in the art, using communication connectivity not illustrated in FIG. 1B, control signals from controller 240 may control certain variable functionality of switch 220, low noise amplifier 232, frequency synthesizer 234, mixer 236, and analog-to-digital converter 238, for example, as understood by those of skill in the art.

The control signals from controller 240 may, for example, control switch 220 to select which of multiple antennas RF chain 230 receives the high frequency signals from.

For example, controller 240 may generate control signals which result in controller 240 receiving a group of digital signals, where each digital signal of the group is generated by RF chain 230 based on a high frequency signal received by a selected one of the antennas. In embodiments having multiple antennas each connected to one of multiple RF chains, controller 240 may generate control signals for each of the RF chains, such that controller 240 receives a group of digital signals, where each digital signal of the group is generated by one of the RF chains based on an RF signal received by the particular antenna connected thereto.

FIG. 2 is a schematic diagram of an embodiment of a transceiver circuit 300 according to some embodiments. Transceiver circuit 300 includes antenna or antenna array 110, switch 120, receiver RF chain 130, transmitter RF chain 230, and controller 140. Transceiver circuit 300 illustrates a particular example. Other embodiments of transceiver circuits may be used.

Antenna or antenna array 110 may be any antenna or antenna array. For example, in some embodiments, antenna or antenna array 110 includes 1, 2, 3, 4, or more antennas. In some embodiments, antenna or antenna array 110 includes a linear antenna array. In some embodiments, antenna or antenna array 110 includes a two dimensional antenna array, for example, having multiple rows of linear antenna arrays.

In embodiments where antenna or antenna array 110 includes one antenna, the one antenna may be connected directly to transmitter RF chain 130 and receiver RF chain 230, and switch 120 may be omitted. In embodiments where antenna or antenna array 110 includes multiple antennas, each antenna may be directly connected to a separate receiver RF chain. Each of the receiver RF chains may have the features of receiver RF chain 130. In embodiments where antenna or antenna array 110 includes multiple antennas, each antenna may be directly connected to a separate transmitter RF chain. Each of the transmitter RF chains may have the features of transmitter RF chain 230.

Antenna or antenna array 110 may be configured to transmit RF signals to a receiver circuit, such as receiver circuit 200, or to another transceiver circuit. The RF signals include a high frequency signal at a carrier frequency modulated with a low frequency information signal. The high frequency signal is transmitted by one of the antennas from antenna or antenna array 110, for example, according to a programmable electrical connection formed by switch 120, as controlled by controller 140.

Controller 140 is configured to provide a baseband digital signal to RF chain 130, where the digital signal encodes the information signal to be transmitted by antenna or antenna array 110.

RF chain 130 includes digital to analog converter (DAC) 132, bidirectional mixer 336, frequency synthesizer 334, and power amplifier (PA) 138. RF chain 130 is an example only, and embodiments of other RF chains may alternatively be used. For example, in some embodiments, one or more amplifiers, and/or filters may be included, as understood by those of skill in the art.

The digital signal is processed by the digital to analog converter 132 to generate an analog intermediate or baseband frequency signal (IF signal or BB signal) representing the digital signal, using techniques known in the art. Various up-conversion, baseband and/or IF signal processing, and digital to analog converter structures known in the art may be used.

Bidirectional mixer 336 receives the analog intermediate or baseband frequency signal output from the digital to analog converter 132 and an oscillator signal at the carrier frequency generated by frequency synthesizer 334. In response to the analog intermediate or baseband frequency signal and the oscillator signal, bidirectional mixer 336 up converts the analog intermediate or baseband frequency signal from the analog-to-digital converter 132 to a high frequency signal, using techniques known in the art. Various mixer structures known in the art may be used. The resulting high frequency signal is at the carrier frequency in this modulated so as to include the information of the low frequency information signal.

Power amplifier 138 is configured to receive the high frequency signal the high frequency signal is driven to one of the antennas from antenna or antenna array 110, for example, according to a programmable electrical connection formed by switch 120, as controlled by controller 140. The power amplifier 138 drives the high frequency signal to one of the antennas using techniques known in the art. Various power amplifier structures known in the art may be used.

As understood by those of skill in the art, using communication connectivity not illustrated in FIG. 2, control signals from controller 140 may control certain variable functionality of switch 120, power amplifier 138, frequency synthesizer 134, bidirectional mixer 336, and digital to analog converter 132, to cause transceiver circuit 300 to transmit data with RF signals, for example, as understood by those of skill in the art.

The control signals from controller 140 may, for example, control switch 120 to control which of multiple antennas RF chain 130 drives the high frequency signal with.

In embodiments having multiple antennas each connected to one of multiple transmitter RF chains, controller 140 may generate control signals for each of the transmitter RF chains.

In embodiments where antenna or antenna array 110 includes one antenna, the one antenna may be connected directly to receiver RF chain 230, and switch 120 may be omitted. In embodiments where antenna or antenna array 110 includes multiple antennas, each antenna may be directly connected to a separate receiver RF chain. Each of the receiver RF chains may have the features of receiver RF chain 230.

Antenna or antenna array 110 may be configured to receive RF signals generated by a transmitter, such as transmitter 100 or from another transceiver circuit.

RF chain 230 includes low noise amplifier (LNA) 232, frequency synthesizer 334, bidirectional mixer 336, and analog to digital converter (ADC) 238. RF chain 230 is an example only, and embodiments of other RF chains may alternatively be used. For example, in some embodiments, one or more amplifiers, and/or filters may be included, as understood by those of skill in the art.

Low noise amplifier 232 is configured to receive a high frequency signal at a carrier frequency and modulated with a low frequency information signal. The high frequency signal is received from one of the antennas from antenna or antenna array 110, for example, according to a programmable electrical connection formed by switch 120, as controlled by controller 140. The high frequency signal is amplified by low noise amplifier 232 to generate an amplified RF signal, using techniques known in the art. Various low noise amplifier structures known in the art may be used.

Bidirectional mixer 336 receives the amplified RF signal output from the low noise amplifier 232 and an oscillator signal at or substantially at the carrier frequency generated by frequency synthesizer 334. In response to the amplified RF signal and the oscillator signal, bidirectional mixer 336 down converts the amplified RF signal from the low noise amplifier 232 to an intermediate or baseband frequency signal, using techniques known in the art. Various mixer structures known in the art may be used. The resulting intermediate or baseband frequency signal includes information of the low frequency information signal.

The intermediate or baseband frequency signal is then processed by the analog-to-digital converter 238 to generate a baseband digital signal representing the intermediate or baseband frequency signal, using techniques known in the art. Various baseband and/or IF signal processing, down-conversion, and analog-to-digital converter structures known in the art may be used.

Controller 140 receives the digital representation of the intermediate or baseband frequency signal.

As understood by those of skill in the art, using communication connectivity not illustrated in FIG. 2, control signals from controller 240 may control certain variable functionality of switch 120, low noise amplifier 232, frequency synthesizer 334, bidirectional mixer 336, and analog-to-digital converter 238, to cause transceiver circuit 300 to receive data from RF signals, for example, as understood by those of skill in the art.

The control signals from controller 140 may, for example, control switch 120 to select which of multiple antennas receiver RF chain 230 receives the high frequency signals from.

For example, controller 140 may generate control signals which result in controller 140 receiving a group of digital signals, where each digital signal of the group is generated by receiver RF chain 230 based on a high frequency signal received by a selected one of the antennas. In embodiments having multiple antennas each connected to one of multiple receiver RF chains, controller 140 may generate control signals for each of the receiver RF chains, such that controller 140 receives a group of digital signals, where each digital signal of the group is generated by one of the receiver RF chains based on an RF signal received by the particular antenna connected thereto.

Figure 3:
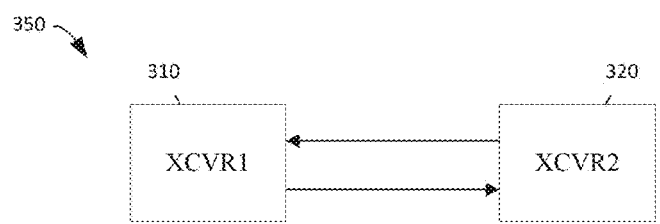
FIG. 3 is schematic diagram of first and second transceivers communicating wirelessly.

FIG. 3 is schematic diagram of a system 350 having first and second transceiver circuits 310 and 320 communicating wirelessly. Instantiations of transceiver circuit 300 may be used as either or both of first and second transceiver circuits 310 and 320. Each of first and second transceiver circuits 310 and 320 may have features similar or identical to that of transceiver circuit 300, discussed with reference to FIG. 2.

Other transceiver circuits may be used as either or both of first and second transceiver circuits 310 and 320.

In some embodiments, it may be advantageous for first transceiver circuit 310 to determine a distance between first and second transceiver circuits 310 and 320. Additionally or alternatively, it may be advantageous for second transceiver circuit 320 to determine a distance between first and second transceiver circuits 310 and 320.

Three methods for distance estimation may be used: Received Signal Strength Indicator (RSSI)-based, time-based, and phase-based measurements.

In RSSI-based methods, the receiver of the signal will calculate its distance to the transmitter based on the attenuation of the transmitted signal over the distance. RSSI-based solutions are very sensitive to multipath fading and other environmental influences such as humidity. In some time-based solutions, the transit time of the signal may be measured directly. Therefore, these methods require highly synchronized clocks to calculate the time between departure and arrival which is impossible in many systems. Moreover, time-based solutions may use a large signal bandwidth in order to have acceptable accuracy in multipath environments, which is incompatible with many narrowband technologies such as Bluetooth Low-Energy (BLE).

In phase-based methods, the amount of signal-phase shifts between transmitter and receiver may be used to calculate the distance between them. In order to mitigate the error due to multipath problem, the phase changes may be measured over multiple frequencies to calculate the distance between them. This procedure is called Multi-Carrier Phase Difference (MCPD). For the MCPD distance estimation, two roles are defined:

Initiator: The device that starts the estimation procedure.
Reflector: The device that responds to the initiator.

Based on how initiator and reflector interact, there are at least two different ways to implement MCPD: One-Way and Two-Way.

One-Way MCPD: The initiator sends continuous Wave (CW) signals to Reflector across the frequency band of interest with a predefined frequency step. The received signals at the reflector are used to estimate the distance between the two devices. This method has errors related to phase incoherency over the whole frequency band of interest.

Two-Way MCPD: The initiator and reflector exchange CW signals at different frequencies across the frequency band of interest in a back and forth ping pong fashion. This method has errors related to phase incoherency only over phase one ping pong communication from initiator to reflector and vice versa, rather than over the whole frequency band of interest.

In the discussion below, the example embodiments illustrate Two-Way MCPD (TWMCPD) method. As understood by those of skill in the art, the principles may also be applied to one-way MCPD.

The TWMCPD method may have three main stages:

Frequency sweep: Initiator and reflector send CW signals to each other at different channel frequencies across the frequency band of interest.

Data transfer (IQ samples transfer): The reflector sends all its received IQ samples back to the initiator.

Distance Estimation: The initiator uses the data to estimate the distance.

The communications of the TWMCPD may us a non-zero-IF receiver frequency plan. In the non-zero-IF receiver plan, the RF signal at the receiver is mixed down to a non-zero intermediate frequency. Non-zero-IF receivers have many of the desirable properties of zero-IF receivers, and have improved performance in 1/f noise, I/Q mismatch, and DC offsets, as compared to zero-IF receivers.

Frequency synthesizer Leakage and DC offset: At least because of capacitive and substrate coupling, receivers suffer from imperfect isolation between the frequency synthesizer and the mixer and the LNA. Because of this there will be RF feed or leakage from the frequency synthesizer to the mixer and LNA. This RF leakage mixes with the RF signal (self-mixing), and produces DC offsets in the mixer output signal. The DC offsets are a problem for zero-IF receivers at least because they may result in saturation of following stages in the receiver chain. The DC offsets are not a problem or less of a problem for non-zero-IF receivers because they are they are outside the signal band and are filtered out.

Sensitivity to 1/f noise: In zero-IF receivers, because the IF is at DC, any low frequency noise, such as 1/f noise, is particularly harmful. The low frequency noise is not a problem or less of a problem for non-zero-IF receivers because the low frequency noise is outside the signal band and is filtered out.

I/Q mismatch: IQ imbalances occur due to mismatches between the parallel sections of the receiver chain dealing with the in-phase and quadrature signal paths and results in signal quality degradation. Non-zero-IF receivers are less vulnerable to I/Q mismatch because the I and Q signals are separated by 2*IF.

Figure 4:
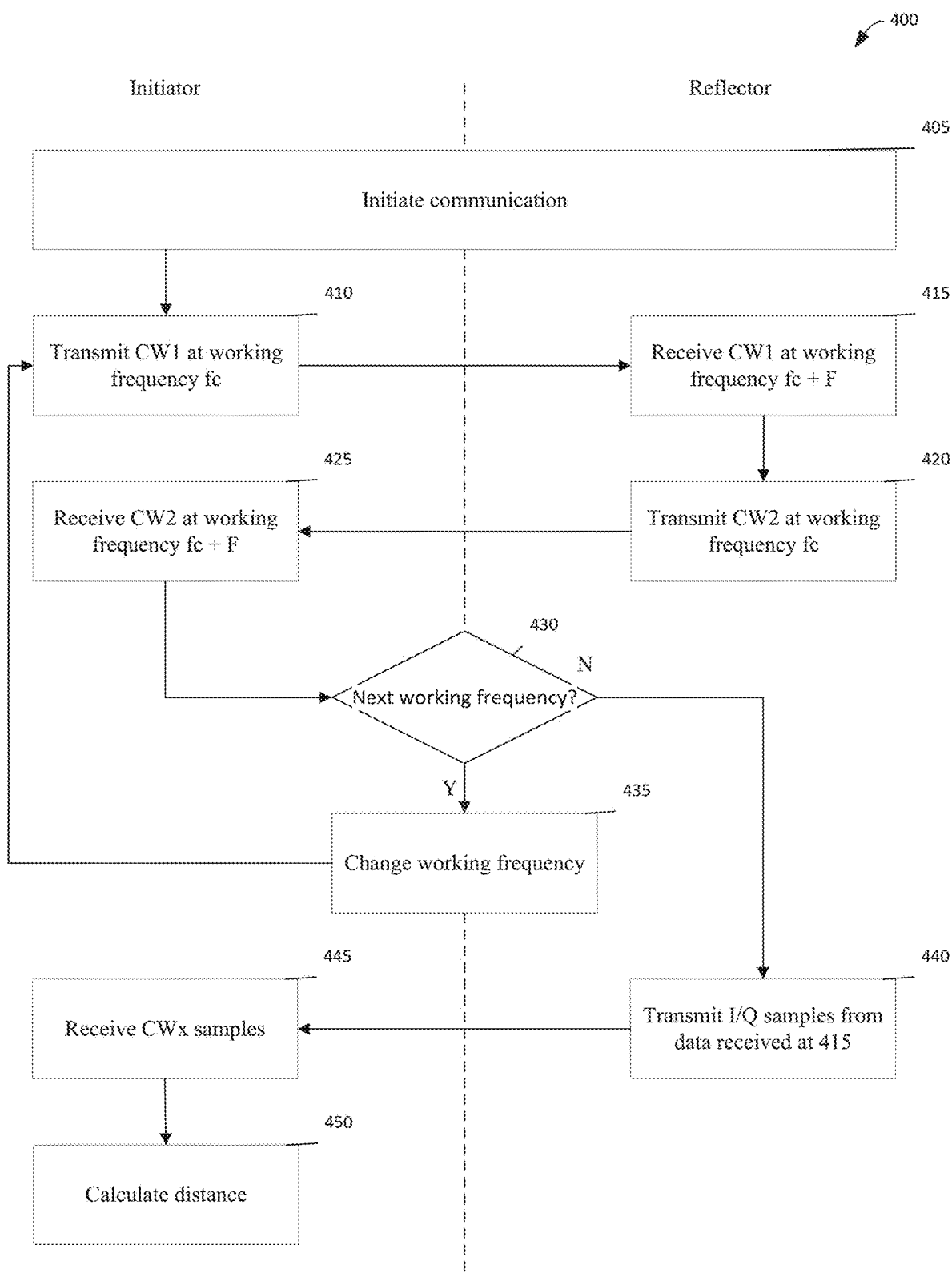
FIG. 4 is a flowchart diagram illustrating a method of determining a distance between first and second transceivers according to some embodiments.

FIG. 4 is a flowchart diagram illustrating a TWMCPD method 400 of determining a distance between first and second transceivers according to some embodiments. Method 400 may be performed by first and second transceiver circuits 310 and 320. The first and second transceivers may communicate according to a communications standard.

At 405, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 400 be performed. The communication between the first and second transceiver circuits 310 and 320 identifies the one of the first and second transceiver circuits 310 and 320 as the initiator and the other of the first and second transceiver circuits 310 and 320 as the reflector. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 410, the initiator transceiver circuit transmits a first continuous wave or other signal as a first initiation signal to the reflector transceiver circuit at a first working frequency of the frequency band of interest. The IF signal may be DC, such that the transmitter of the initiator transceiver circuit operates is a zero-IF transmitter. In some embodiments, either or both of the first working frequency and the frequency band of interest were communicated at 405. In some embodiments, either or both of the first working frequency and the frequency band of interest are specified by the communications standard.

At 415, the reflector transceiver circuit receives the first continuous wave or other signal from the initiator transceiver circuit with its frequency synthesizer operating at the first working frequency fc plus an IF offset frequency F. In addition, the IF signal may have frequency F, so that the receiver of the reflector transceiver circuit operates as a non-zero IF receiver. F may be positive or negative, such that the reflector transceiver circuit may be operating in a high-side or a low-side injection mode. The frequency fc may be a transmission frequency specified by the communications standard. The frequency fc+F may be a transmission frequency not specified by the communications standard.

At 415, the reflector transceiver circuit also performs I/Q measurement on the received continuous wave or other signal.

At 420, the reflector transceiver circuit transmits a second continuous wave or other signal as a first reflection signal to the initiator transceiver circuit at the first working frequency of the frequency band of interest. The IF signal may be DC, such that the transmitter of the reflector transceiver circuit operates is a zero-IF transmitter.

A frequency synthesizer controlling the oscillator signal at a working frequency for both the receive action of 415 and the transmit action of 420 is set before 415 and is reset between 415 and 420. Accordingly, a locking circuit, such as a PLL or a DLL, of the frequency synthesizer may be locked before 415 at a working frequency=fc, and relock at a new working frequency=fc+F between 415 and 420.

At 425, the initiator transceiver circuit receives the second continuous wave or other signal from the reflector transceiver circuit with its frequency synthesizer operating at the first working frequency fc plus an IF offset frequency F. In addition, the IF signal may have frequency F, so that the receiver of the initiator transceiver circuit operates as a non-zero IF receiver. F may be positive or negative, such that the initiator transceiver circuit may be operating in a high-side or a low-side injection mode.

A frequency synthesizer controlling the oscillator signal at a carrier frequency for both the transmit action of 410 and the receive action of 425 is set before 410 and is reset between 410 and 425. Accordingly, a locking circuit, such as a PLL or a DLL, of the frequency synthesizer may be locked before 410 at a carrier frequency=fc, and relock at a new carrier frequency=fc+F between 410 and 425.

At 430, if another working frequency of the frequency band of interest is to be used, at 435, the working frequency is changed, and the method 400 returns to 410. Any total number of working frequencies may be used.

Otherwise, if another working frequency of the frequency band of interest is not to be used, at 440, the reflector transceiver circuit transmits data representing the I/Q measurements made at all occurrences of 415 to the initiator transceiver circuit. The working frequency of the transmission may be the last working frequency used at 410, 415, 420, and 425. In some embodiments, the working frequency of the transmission is another frequency, for example, of the frequency band of interest. The other frequency may have been communicated at 405. In some embodiments, the other frequency is specified by a communications standard.

At 445, the initiator transceiver circuit receives the data transmitted by the reflector transceiver circuit at 440. The initiator transceiver circuit receives the data transmitted from the reflector transceiver circuit at the working frequency.

At 450, the initiator transceiver circuit estimates the distance between the initiator transceiver circuit and the reflector transceiver circuit based on the I/Q data received from the reflector transceiver circuit at 445 and generated at the occurrences of 425. For example, the distance may be estimated according to the equation shown above:

$$\hat{r} = \frac{C}{4\pi \Delta f} \Delta \varphi \left( \mod \frac{C}{2\Delta f} \right)$$

Figure 5:
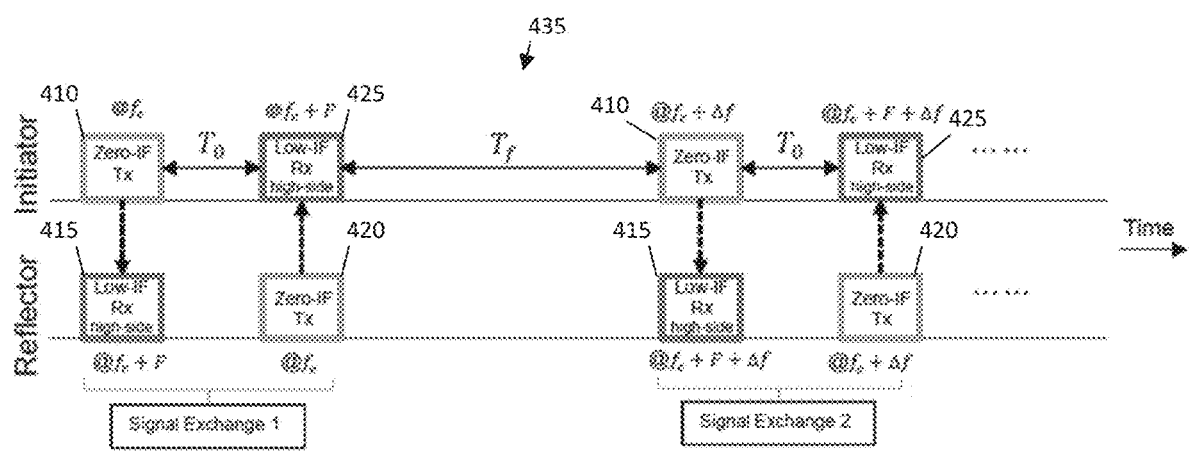
FIG. 5 is a schematic diagram representing the actions of the first and second transceivers performing certain portions of the method of FIG. 4 according to some embodiments.

FIG. 5 is a schematic diagram representing the actions of the first and second transceivers performing certain portions of a ranging event according to the method of FIG. 4 according to some embodiments.

As illustrated, first and second signal exchanges are represented, where each signal exchange includes:
the initiator circuit transmitting a $1^{st}$ signal at working frequency=fc, at 410;
the reflector circuit receiving the $1^{st}$ signal at working frequency=fc+F, at 415;
after a time $T_0$,
the reflector circuit transmitting a $2^{nd}$ signal at working frequency=fc, at 420; and
the initiator circuit receiving the $2^{nd}$ signal at working frequency=fc+F, at 425.

As illustrated, the working frequencies of the first signal exchange 1 are fc and fc+F, and the working frequencies of the second signal exchange 2 are fc+Δf, and fc+Δf+F. In addition, FIG. 5 illustrates that the second signal exchange 2 happens a time $T_f$ after the first signal exchange 1, where during time $T_f$, the working frequency of the initiator circuit and the reflector circuit is changed by Δf at 435.

Figure 6:
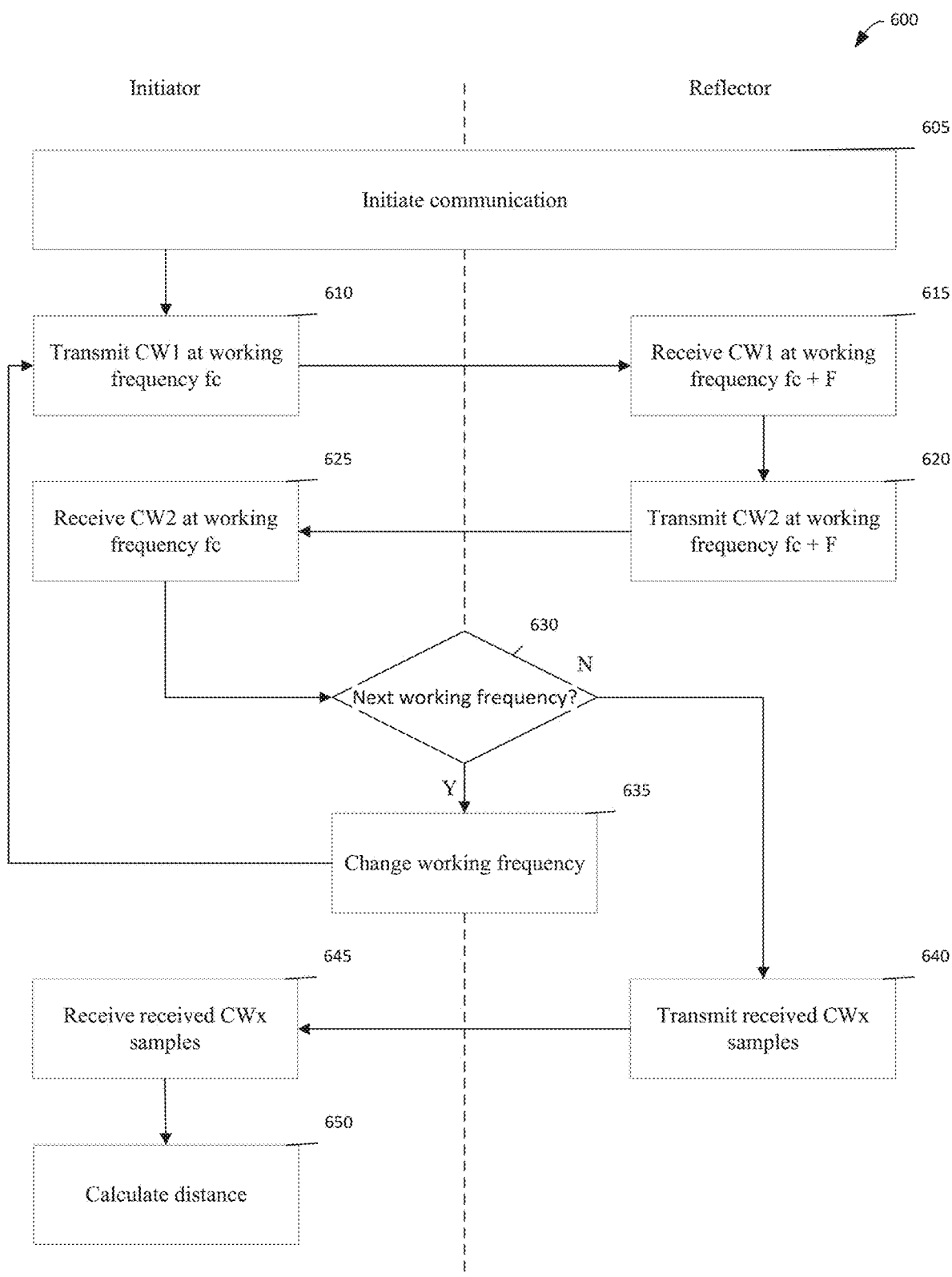
FIG. 6 is a flowchart diagram illustrating a method of determining a distance between first and second transceivers according to some embodiments.

FIG. 6 is a flowchart diagram illustrating a TWMCPD method 600 of determining a distance between first and second transceivers according to some embodiments. Method 600 may be performed by first and second transceiver circuits 310 and 320. The first and second transceivers may communicate according to a communications standard.

At 605, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 600 be performed. The communication between the first and second transceiver circuits 310 and 320 identifies the one of the first and second transceiver circuits 310 and 320 as the initiator and the other of the first and second transceiver circuits 310 and 320 as the reflector. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 610, the initiator transceiver circuit transmits a first continuous wave or other signal as a first initiation signal to the reflector transceiver circuit with its frequency synthesizer operating at a first working frequency of the frequency band of interest. The IF signal may be DC, such that the transmitter of the initiator transceiver circuit operates is a zero-IF transmitter. In some embodiments, either or both of the first working frequency and the frequency band of interest were communicated at 605. In some embodiments, either or both of the first working frequency and the frequency band of interest are specified by the communications standard.

At 615, the reflector transceiver circuit receives the first continuous wave or other signal from the initiator transceiver circuit with its frequency synthesizer operating at the first working frequency fc plus an IF offset frequency F. In addition, the IF signal may have frequency F, so that the receiver of the reflector transceiver circuit operates as a non-zero IF receiver. F may be positive or negative, such that the reflector transceiver circuit may be operating in a high-side or a low-side injection mode. The frequency fc may be a transmission frequency specified by the communications standard. The frequency fc+F may be a transmission frequency not specified by the communications standard.

At 615, the reflector transceiver circuit also performs I/Q measurement on the received continuous wave or other signal.

At 620, the reflector transceiver circuit transmits a second continuous wave or other signal as a first reflection signal to the initiator transceiver circuit with its frequency synthesizer operating at the first working frequency fc plus IF offset frequency F. The IF signal may be DC, such that the transmitter of the initiator transceiver circuit operates is a zero-IF transmitter.

In some embodiments, a frequency synthesizer controlling the working frequency for both the receive action of 615 and the transmit action of 620 is set before 615 and is not reset between 615 and 620. Accordingly, a locking circuit, such as a PLL or a DLL, of the frequency synthesizer may be locked before 615 at a carrier frequency of fc+F, and remain locked throughout 615 and 620.

At 625, the initiator transceiver circuit receives the second continuous wave or other signal from the reflector transceiver circuit with its frequency synthesizer operating at the first working frequency fc. In addition, the IF signal may have frequency F, so that the receiver of the initiator transceiver circuit operates as a non-zero IF receiver. F may be positive or negative, such that the initiator transceiver circuit may be operating in a high-side or a low-side injection mode.

In some embodiments, a frequency synthesizer controlling the working frequency for both the transmit action of 610 and the receive action of 625 is set before 610 and is not reset between 610 and 625. Accordingly, a locking circuit, such as a PLL or a DLL, of the frequency synthesizer may be locked before 610 at a carrier frequency of fc, and remain locked throughout 610 and 625.

At 630, if another working frequency of the frequency band of interest is to be used, at 635, the working frequency is changed, and the method 600 returns to 610. Any total number of working frequencies may be used.

Otherwise, if another working frequency of the frequency band of interest is not to be used, at 640, the reflector transceiver circuit transmits data representing the I/Q measurements made at all occurrences of 615 to the initiator transceiver circuit. The working frequency of the transmission may be the last working frequency used at 610, 615, 620, and 625. In some embodiments, the working frequency of the transmission is another frequency, for example, of the frequency band of interest. The other frequency may have been communicated at 605. In some embodiments, the other frequency is specified by a communications standard.

At 645, the initiator transceiver circuit receives the data transmitted by the reflector transceiver circuit at 640. The initiator transceiver circuit receives the data transmitted from the reflector transceiver circuit at the working frequency.

At 650, the initiator transceiver circuit estimates the distance between the initiator transceiver circuit and the reflector transceiver circuit based on the I/Q data received from the reflector transceiver circuit at 645 and generated at the occurrences of 625.

Figure 7:
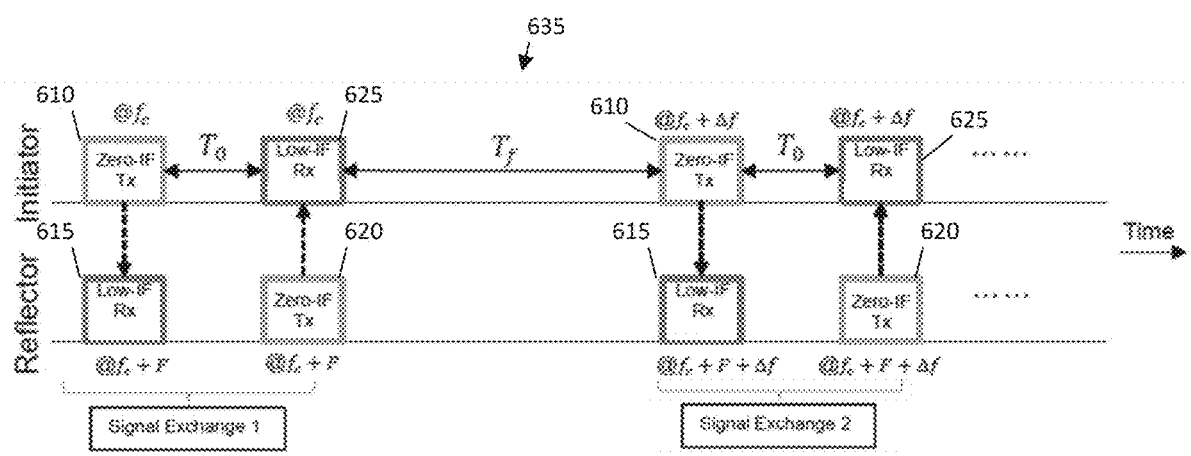
FIG. 7 is a schematic diagram representing the actions of the first and second transceivers performing certain portions of the method of FIG. 6 according to some embodiments.

FIG. 7 is a schematic diagram representing the actions of the first and second transceivers performing certain portions of a ranging event according to the method of FIG. 6 according to some embodiments.

As illustrated, first and second signal exchanges are represented, where each signal exchange includes:

the initiator circuit transmitting a $1^{st}$ signal at working frequency=fc, at 610;

the reflector circuit receiving the $1^{st}$ signal at working frequency=fc+F, at 615;

after a time $T_0$, the reflector circuit transmitting a $2^{nd}$ signal at working frequency=fc+F, at 620; and the initiator circuit receiving the $2^{nd}$ signal at working frequency=fc, at 625.

As illustrated, the working frequencies of the first signal exchange 1 are fc and fc+F, and the working frequencies of the second signal exchange 2 are fc+$\Delta$f, and fc+$\Delta$f+F. In addition, FIG. 7 illustrates that the second signal exchange 2 happens a time $T_f$ after the first signal exchange 1, where during time $T_f$, the working frequency of the initiator circuit and the reflector circuit is changed from fc to fc+$\Delta$f, at 635.

Figure 8:
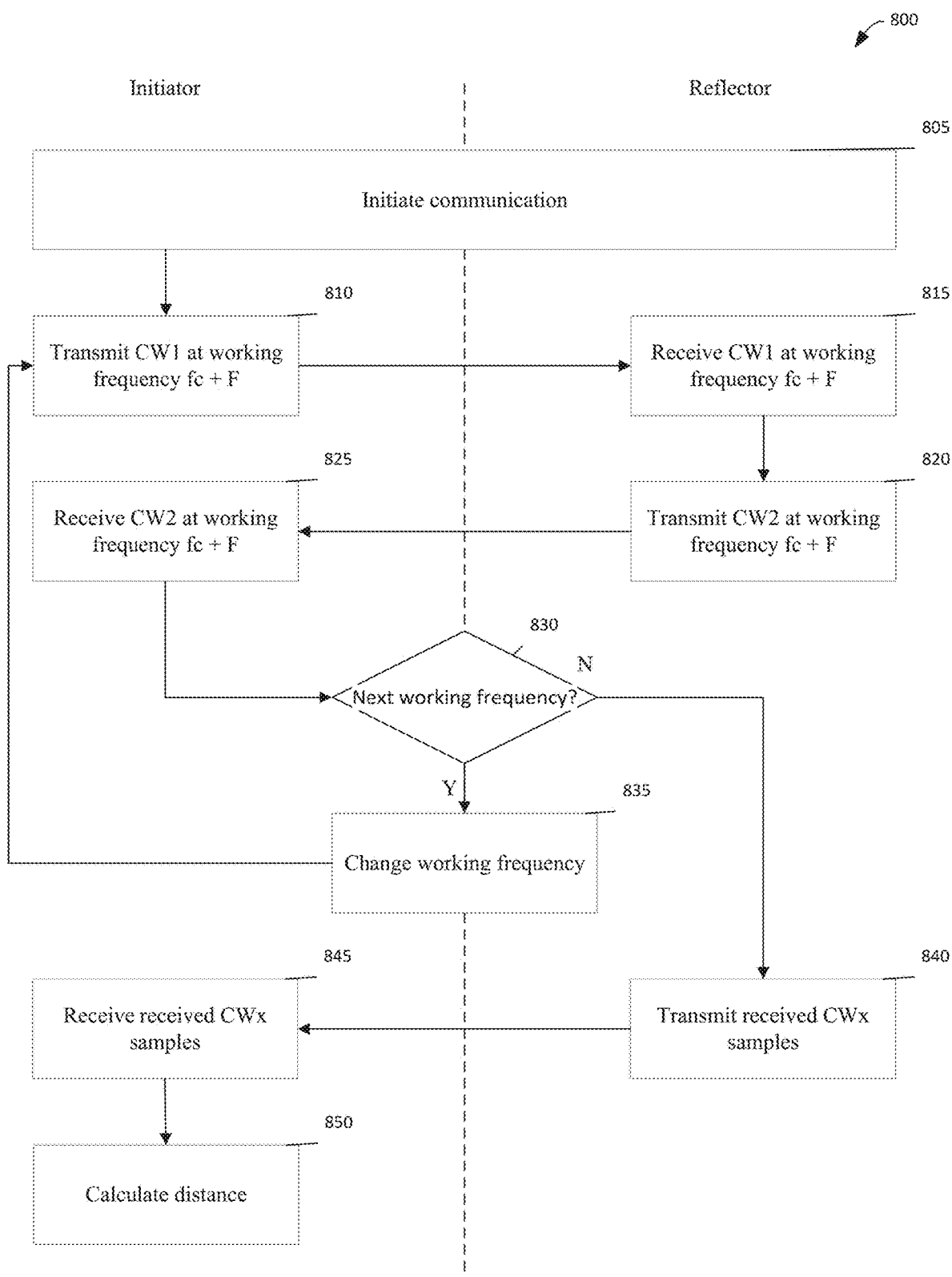
FIG. 8 is a flowchart diagram illustrating a method of determining a distance between first and second transceivers according to some embodiments.

FIG. 8 is a flowchart diagram illustrating a TWMCPD method 800 of determining a distance between first and second transceivers according to some embodiments. Method 800 may be performed by first and second transceiver circuits 310 and 320. The first and second transceivers may communicate according to the communications standard.

At 805, in response to determining that a distance between the first and second transceiver circuits 310 and 320 is needed or desired, one of the first and second transceiver circuits 310 and 320 communicates with the other of first and second transceiver circuits 310 and 320. The communication may request that the method of 800 be performed. The communication between the first and second transceiver circuits 310 and 320 identifies the one of the first and second transceiver circuits 310 and 320 as the initiator and the other of the first and second transceiver circuits 310 and 320 as the reflector. In addition, the communication between the first and second transceiver circuits 310 and 320 specifies the frequency band of interest and the particular channel frequencies for the back and forth ping pong communications which will be used for the initiator to determine the distance. The communication may specify other conditions for the distance determination process.

At 810, the initiator transceiver circuit transmits a first continuous wave or other signal as a first initiation signal to the reflector transceiver circuit with its frequency synthesizer operating at a first working frequency fc plus IF offset frequency F. F may be positive or negative, such that the initiator transceiver circuit may be operating in a high-side or a low-side injection mode. In some embodiments, either or both of the first working frequency and the frequency band of interest were communicated at 805. In some embodiments, either or both of the first working frequency and the frequency band of interest are specified by the communications standard.

At 815, the reflector transceiver circuit receives the first continuous wave or other signal from the initiator transceiver circuit with its frequency synthesizer operating at the first working frequency fc plus the IF offset frequency F. In addition, the IF signal may have frequency F, so that the receiver of the reflector transceiver circuit operates as a non-zero IF receiver. The frequency fc may be a transmission frequency specified by the communications standard. The frequency fc+F may be a transmission frequency not specified by the communications standard. At 815, the reflector initiator transceiver circuit may be operating in a high-side or a low-side injection mode.

At 815, the reflector transceiver circuit also performs I/Q measurement on the received continuous wave or other signal.

At 820, the reflector transceiver circuit transmits a second continuous wave or other signal as a first reflection signal to the initiator transceiver circuit with its frequency synthesizer operating at the first working frequency fc plus IF offset frequency F. F may be positive or negative, such that the reflector transceiver circuit may be operating in a high-side or a low-side injection mode.

In some embodiments, a frequency synthesizer controlling the working frequency for both the receive action of 815 and the transmit action of 820 is set before 815 and is not reset between 815 and 820. Accordingly, a locking circuit, such as a PLL or a DLL, of the frequency synthesizer may be locked before 815 at carrier frequency fc+F, and remain locked throughout 815 and 820.

At 825, the initiator transceiver circuit receives the second continuous wave or other signal from the reflector transceiver circuit with its frequency synthesizer operating at the first working frequency fc plus an IF offset frequency F. In addition, the IF signal may have frequency F, so that the receiver of the initiator transceiver circuit operates as a non-zero IF receiver. F may be positive or negative, such that the initiator transceiver circuit may be operating in a high-side or a low-side injection mode.

In some embodiments, at 810 the initiator transceiver circuit operates in a high-side injection mode, at 815 the reflector initiator transceiver circuit operates in a high-side injection mode, at 820 the reflector transceiver circuit may operates in a high-side injection mode, and at 825 the initiator transceiver circuit operates in a high-side injection mode. In some embodiments, at 810 the initiator transceiver circuit operates in a low-side injection mode, at 815 the reflector initiator transceiver circuit operates in a low-side injection mode, at 820 the reflector transceiver circuit may operates in a low-side injection mode, and at 825 the initiator transceiver circuit operates in a low-side injection mode.

In some embodiments, a frequency synthesizer controlling the working frequency for both the transmit action of 810 and the receive action of 825 is set before 810 and is not reset between 810 and 825. Accordingly, a locking circuit, such as a PLL or a DLL, of the frequency synthesizer may be locked before 810 at carrier frequency fc+F, and remain locked throughout 810 and 825.

In some embodiments, the order of operations is different. For example, in some embodiments, 820 occurs after 805, 825 occurs after 820, 810 occurs after 825, 815 occurs after 810, and 830 occurs after 815.

At 830, if another working frequency of the frequency band of interest is to be used, at 835, the working frequency is changed, and the method 800 returns to 810. Any total number of working frequencies may be used.

Otherwise, if another working frequency of the frequency band of interest is not to be used, at 840, the reflector transceiver circuit transmits data representing the I/Q measurements made at all occurrences of 815 to the initiator transceiver circuit. The working frequency of the transmission may be the last working frequency used at 810, 815, 820, and 825. In some embodiments, the working frequency of the transmission is another frequency, for example, of the frequency band of interest. The other frequency may have been communicated at 805. In some embodiments, the other frequency is specified by a communications standard.

At 845, the initiator transceiver circuit receives the data transmitted by the reflector transceiver circuit at 840. The initiator transceiver circuit receives the data transmitted from the reflector transceiver circuit with its frequency synthesizer operating at the working frequency.

At 850, the initiator transceiver circuit estimates the distance between the initiator transceiver circuit and the reflector transceiver circuit based on the I/Q data received from the reflector transceiver circuit at 845 and generated at the occurrences of 825.

Figure 9:
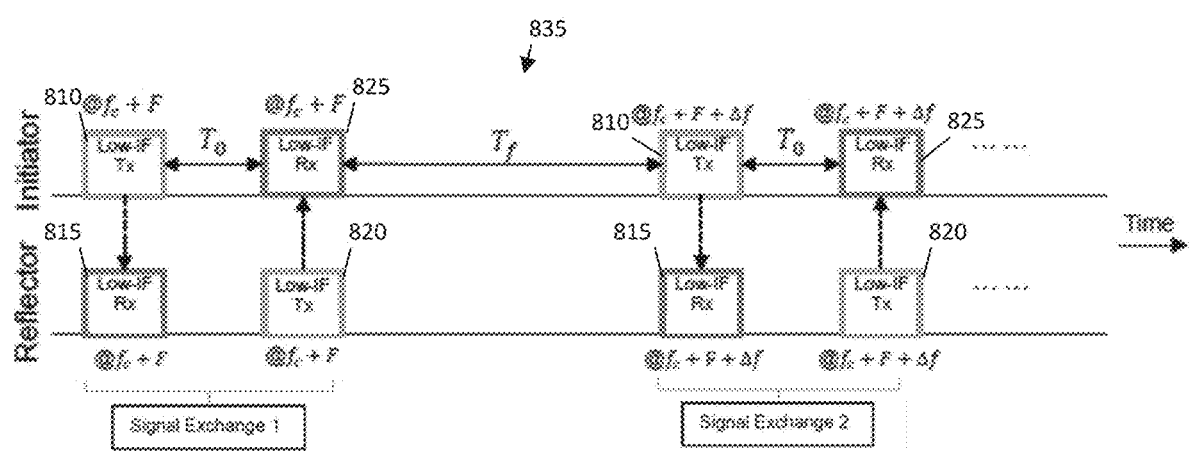
FIG. 9 is a schematic diagram representing the actions of the first and second transceivers performing certain portions of the method of FIG. 8 according to some embodiments.

FIG. 9 is a schematic diagram representing the actions of the first and second transceivers performing certain portions of a ranging event according to the method of FIG. 8 according to some embodiments.

As illustrated, first and second signal exchanges are represented, where each signal exchange includes:

the initiator circuit transmitting a $1^{st}$ signal at working frequency=fc+F, at 810;

the reflector circuit receiving the $1^{st}$ signal at working frequency=fc+F, at 815;

after a time $T_0$, the reflector circuit transmitting a $2^{nd}$ signal at working frequency=fc+F, at 820; and the initiator circuit receiving the $2^{nd}$ signal at working frequency=fc+F, at 825.

As illustrated, the working frequency of the first signal exchange 1 is fc+F, and the working frequency of the second signal exchange 2 is fc+$\Delta$f+F. In addition, FIG. 9 illustrates that the second signal exchange 2 happens a time $T_f$ after the first signal exchange 1, where during time $T_f$, the working frequency of the initiator circuit and the reflector circuit is changed by Mat 835.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A transceiver circuit, comprising:
an antenna;
a receiver RF chain configured to receive a receiver RF signal from the antenna;
a transmitter RF chain configured to transmit a transmitter RF signal to the antenna;
a frequency synthesizer configured to generate an oscillator signal; and
a controller configured to:
cause the receiver RF chain to receive a first reflection signal from the antenna,
down convert the first reflection signal to a first intermediate frequency signal at a non-zero intermediate frequency,
before causing the transmitter RF chain to transmit a first initiation signal, and, before causing the receiver RF chain to receive the first reflection signal, cause the frequency synthesizer to generate the oscillator signal at a first working frequency;
cause the transmitter RF chain to transmit, at the first working frequency, the first initiation signal to the antenna, wherein the first initiation signal is part of a first signal exchange;
cause the receiver RF chain to receive the first reflection signal from the antenna at the first working frequency, wherein the first reflection signal is part of the first signal exchange;
after causing the transmitter RF chain to transmit the first initiation signal, and, after causing the receiver RF chain to receive the first reflection signal, cause the frequency synthesizer to generate the oscillator signal at a second working frequency, wherein the second working frequency is not equal to the first working frequency; and
cause the frequency synthesizer to continuously generate the oscillator signal at the first working frequency until the causing of the frequency synthesizer to generate the oscillator signal at the second working frequency, and
determine a range estimate to another transceiver circuit based on a phase of the first reflection signal.

2. The transceiver circuit of claim 1, wherein one of:
the transmitter RF chain transmits the first initiation signal operating in a zero-IF mode, and the receiver RF chain receives the first reflection signal operating in a high-side injection mode; and
the transmitter RF chain transmits the first initiation signal operating in the zero-IF mode, and the receiver RF chain receives the first reflection signal operating in a low-side injection mode.

3. The transceiver circuit of claim 1, wherein one of:
the transmitter RF chain transmits the first initiation signal operating in a transmitter high-side injection mode, and the receiver RF chain receives the first reflection signal operating in a receiver high-side injection mode; and
the transmitter RF chain transmits the first initiation signal operating in a transmitter low-side injection mode, and the receiver RF chain receives the first reflection signal operating in a receiver low-side injection mode.

4. The transceiver circuit of claim 1, wherein the controller is further configured to, after causing the frequency synthesizer to generate the oscillator signal at the second working frequency:
cause the transmitter RF chain to transmit, at the second working frequency, a second initiation signal to the antenna, wherein the second initiation signal is part of a second signal exchange,
cause the receiver RF chain to receive, at the second working frequency, a second reflection signal from the antenna, wherein the second reflection signal is part of the second signal exchange,
cause the receiver RF chain to down convert the second reflection signal to a second intermediate frequency signal at the non-zero intermediate frequency,
after causing the transmitter RF chain to transmit the second initiation signal, and, after causing the receiver RF chain to receive the second reflection signal, cause the frequency synthesizer to generate the oscillator signal at a third working frequency, wherein the third working frequency is not equal to the second working frequency, and
cause the frequency synthesizer to continuously generate the oscillator signal at the second working frequency until the causing of the frequency synthesizer to generate the oscillator signal at the third working frequency.

5. The transceiver circuit of claim 4, wherein the controller is further configured to determine the range estimate based on a phase of the second reflection signal.

6. The transceiver circuit of claim 1, wherein the transmitter RF chain transmits the first initiation signal to the antenna operating with a DC intermediate frequency.

7. The transceiver circuit of claim 1, wherein the transmitter RF chain transmits the first initiation signal to the antenna operating with a non-zero intermediate frequency.

8. A transceiver circuit, comprising:
an antenna;
a receiver RF chain configured to receive a receiver RF signal from the antenna;
a transmitter RF chain configured to transmit a transmitter RF signal to the antenna;
a frequency synthesizer configured to generate an oscillator signal; and
a controller configured to:
before causing the receiver RF chain to receive a first initiation signal, and, before causing the transmitter RF chain to transmit a first reflection signal, causing the frequency synthesizer to generate the oscillator signal at a first working frequency,
cause the receiver RF chain to receive, at the first working frequency, the first initiation signal from the antenna, wherein the first initiation signal is part of a first signal exchange,
cause the receiver RF chain to down convert the first initiation signal to a first intermediate frequency signal at a non-zero intermediate frequency,
cause the transmitter RF chain to transmit, at the first working frequency, the first reflection signal to the antenna, wherein the first reflection signal is part of the first signal exchange,
after causing the transmitter RF chain to transmit the first reflection signal, and, after causing the receiver RF chain to receive the first initiation signal, cause the frequency synthesizer to generate the oscillator signal at a second working frequency, wherein the second working frequency is not equal to the first working frequency, and cause the frequency synthesizer to continuously generate the oscillator signal at the first working frequency until the causing of the frequency synthesizer to generate the oscillator signal at the second working frequency.

9. The transceiver circuit of claim 8, wherein one of:

the transmitter RF chain transmits the first reflection signal operating in a zero-IF mode, and the receiver RF chain receives the first initiation signal operating in a high-side injection mode; and the transmitter RF chain transmits the first reflection signal operating in the zero-IF mode, and the receiver RF chain receives the first initiation signal operating in a low-side injection mode.

10. The transceiver circuit of claim 8, wherein one of:

the transmitter RF chain transmits the first reflection signal operating in a transmitter high-side injection mode, and the receiver RF chain receives the first initiation signal operating in a receiver high-side injection mode; and the transmitter RF chain transmits the first initiation signal operating in a transmitter low-side injection mode, and the receiver RF chain receives the first reflection signal operating in a receiver low-side injection mode.

11. The transceiver circuit of claim 8, wherein the controller is further configured to, after causing the frequency synthesizer to generate the oscillator signal at the second working frequency:

cause the receiver RF chain to receive, at the second working frequency, a second initiation signal from the antenna, wherein the second initiation signal is part of a second signal exchange, cause the receiver RF chain to down convert the second initiation signal to a second intermediate frequency signal at the non-zero intermediate frequency, cause the transmitter RF chain to transmit, at the first working frequency, a second reflection signal to the antenna, wherein the second reflection signal is part of the second signal exchange, after causing the transmitter RF chain to transmit the second reflection signal, and, after causing the receiver RF chain to receive the second initiation signal, cause the frequency synthesizer to generate the oscillator signal at a third working frequency, wherein the third working frequency is not equal to the second working frequency, and cause the frequency synthesizer to continuously generate the oscillator signal at the second working frequency until the causing of the frequency synthesizer to generate the oscillator signal at the third working frequency.

12. The transceiver circuit of claim 11, wherein the first working frequency is specified by a communications standard.

13. The transceiver circuit of claim 11, wherein the first working frequency is offset by the non-zero intermediate frequency from a frequency specified by a communications standard.

14. The transceiver circuit of claim 8, wherein the transmitter RF chain transmits the first reflection signal to the antenna operating with a DC intermediate frequency.

15. The transceiver circuit of claim 8, wherein the transmitter RF chain transmits the first reflection signal to the antenna operating with a non-zero intermediate frequency.

16. A system, comprising:
a first transceiver circuit; and
a second transceiver circuit,
wherein the first transceiver circuit is configured to:
before transmitting a first initiation signal, and, before receiving a first reflection signal, generate a first oscillator signal at a first working frequency,
transmit, at the first working frequency, the first initiation signal to the first transceiver circuit, wherein the first initiation signal is part of a first signal exchange,
receive, at the first working frequency, the first reflection signal from the second transceiver circuit, wherein the first reflection signal is part of the first signal exchange,
down convert the first reflection signal to a first intermediate frequency signal at a first non-zero intermediate frequency,
after transmitting the first initiation signal, and, after receiving the first reflection signal, generate the first oscillator signal at a second working frequency, wherein the second working frequency is not equal to the first working frequency,
generate the first oscillator signal at the first working frequency until the generating of the first oscillator signal at the second working frequency, and
determine a range estimate to the second transceiver circuit based on a phase of the first initiation signal and on a phase of the first reflection signal,
wherein the second transceiver circuit is configured to:
before receiving the first initiation signal, and, before transmitting the first reflection signal, generate a second oscillator signal at a third working frequency,
receive, at the third working frequency, the first initiation signal, wherein the first initiation signal is part of the first signal exchange,
down convert the first initiation signal to a second intermediate frequency signal at a second non-zero intermediate frequency,
transmit, at the third working frequency, the first reflection signal to the first transceiver circuit, wherein the first reflection signal is part of the first signal exchange,
after transmitting the first reflection signal, and, after receiving the first initiation signal, generate the second oscillator signal at a fourth working frequency, wherein the fourth working frequency is not equal to the third working frequency, and
continuously generate the second oscillator signal at the third working frequency until the generating of the second oscillator signal at the fourth working frequency.

17. The system of claim 16, wherein the first transceiver circuit is further configured to determine a range estimate based on the first initiation signal and the first reflection signal.

18. The system of claim 16, wherein the first transceiver circuit is further configured to, after causing generating the first oscillator signal at the second working frequency:

transmit, at the second working frequency, a second initiation signal to the second transceiver circuit, wherein the second initiation signal is part of a second signal exchange, receive, at the second working frequency, a second reflection signal from the second transceiver circuit, wherein the second reflection signal is part of the second signal exchange, down convert the second reflection signal to a third intermediate frequency signal at the first non-zero intermediate frequency, after transmitting the second initiation signal, and, after receiving the second reflection signal, generate the first oscillator signal at a fifth working frequency, wherein the fifth working frequency is not equal to the third working frequency, and continuously generate the first oscillator signal at the second working frequency until the generating of the first oscillator signal at the fifth working frequency, wherein the second transceiver circuit is further configured to, after generating the second oscillator signal at the second working frequency:

transmit, at the fourth working frequency, the second initiation signal to the first transceiver circuit, wherein the second initiation signal is part of the second signal exchange, receive, at the fourth working frequency, the second reflection signal from the first transceiver circuit, wherein the second reflection signal is part of the second signal exchange, down convert the second reflection signal to a fourth intermediate frequency signal at the second non-zero intermediate frequency, after transmitting the second initiation signal, and, after receiving the second reflection signal, generate the second oscillator signal at a sixth working frequency, wherein the sixth working frequency is not equal to the third working frequency, and continuously generate the second oscillator signal at the third working frequency until the generating of the second oscillator signal at the sixth working frequency.

19. The system of claim 18, wherein the first transceiver circuit is configured to determine a range estimate based on the second initiation signal and the second reflection signal.

* * * * *